(12) United States Patent
Cortese

(10) Patent No.: US 9,975,589 B2
(45) Date of Patent: May 22, 2018

(54) LOCK PLATE CONFIGURED TO RETAIN WEAR RUNNER

(71) Applicant: Caterpillar Global Mining America L.L.C., Houston, PA (US)

(72) Inventor: Donald G. Cortese, Washington, PA (US)

(73) Assignee: Caterpillar Global Mining America LLC, Houston, PA (US)

(*) Notice: Subject to any disclaimer, the term of this patent is extended or adjusted under 35 U.S.C. 154(b) by 55 days.

(21) Appl. No.: 15/048,588

(22) Filed: Feb. 19, 2016

(65) Prior Publication Data

US 2017/0240228 A1 Aug. 24, 2017

(51) Int. Cl.

| | |
|---|---|
| *B62D 55/084* | (2006.01) |
| *B33Y 10/00* | (2015.01) |
| *B33Y 80/00* | (2015.01) |
| *B33Y 50/02* | (2015.01) |
| *G06T 17/00* | (2006.01) |
| *B62D 55/08* | (2006.01) |
| *B29L 31/00* | (2006.01) |

(52) U.S. Cl.
CPC .......... *B62D 55/0845* (2013.01); *B33Y 10/00* (2014.12); *B33Y 50/02* (2014.12); *B33Y 80/00* (2014.12); *B62D 55/08* (2013.01); *G06T 17/00* (2013.01); *B29L 2031/727* (2013.01)

(58) Field of Classification Search
CPC ................ B62D 55/08; B62D 55/0845; B62D 55/0847; B62D 55/20; E21C 35/00; E21C 35/04; E21C 35/12; E21C 29/22; E21F 13/00; B65G 11/16
See application file for complete search history.

(56) References Cited

U.S. PATENT DOCUMENTS

| | | | | |
|---|---|---|---|---|
| 2,529,582 A | * | 11/1950 | Zahodiakin | F16B 5/10 411/550 |
| 3,149,882 A | | 9/1964 | Silks et al. | |
| 3,288,234 A | * | 11/1966 | Feliz | A61G 5/023 180/6.5 |
| 3,554,310 A | * | 1/1971 | Dieffenbach | B62D 21/183 180/9.23 |
| 4,190,295 A | * | 2/1980 | Boast | E21C 27/20 299/43 |
| 5,564,508 A | * | 10/1996 | Renski | E02F 9/2883 172/772 |

(Continued)

FOREIGN PATENT DOCUMENTS

| | | | |
|---|---|---|---|
| AU | 200142073 A | * | 11/2002 |
| CN | 201982101 U | | 9/2011 |
| CN | 202031596 U | | 11/2011 |

*Primary Examiner* — Kip T Kotter
(74) *Attorney, Agent, or Firm* — Finnegan, Henderson, Farabow, Garrett & Dunner, LLP

(57) ABSTRACT

A lock plate configured to retain a wear runner against a support may include a first retainer arm, a second retainer arm, and a web coupling the first and second retainer arms to one another. The first retainer arm, the second retainer arm, and the web may define a recess configured to receive a retainer pin associated with the wear runner. The first retainer arm and the second retainer arm may have a thickness configured to fit within a groove extending at least partially around the retainer pin, such that the lock plate holds the wear runner against the support on a side of the support opposite the lock plate.

25 Claims, 7 Drawing Sheets

(56) References Cited

U.S. PATENT DOCUMENTS

| | | | |
|---|---|---|---|
| 5,913,605 A * | 6/1999 | Jusselin | E02F 9/28 |
| | | | 172/772 |
| 5,938,000 A | 8/1999 | Fischer et al. | |
| 6,194,080 B1 * | 2/2001 | Stickling | E02F 9/2841 |
| | | | 172/772 |
| 8,039,075 B2 * | 10/2011 | Malmberg | B02C 17/225 |
| | | | 428/44 |
| 9,650,091 B2 * | 5/2017 | O'Neill | B62D 55/202 |
| 2012/0098327 A1 * | 4/2012 | Schaffer | B62D 55/0847 |
| | | | 305/185 |
| 2012/0104840 A1 * | 5/2012 | Zuchoski | B62D 55/084 |
| | | | 305/100 |
| 2016/0159413 A1 * | 6/2016 | Zimmer | B62D 55/06 |
| | | | 180/9.62 |
| 2017/0167524 A1 * | 6/2017 | Elston | F16B 37/14 |

\* cited by examiner

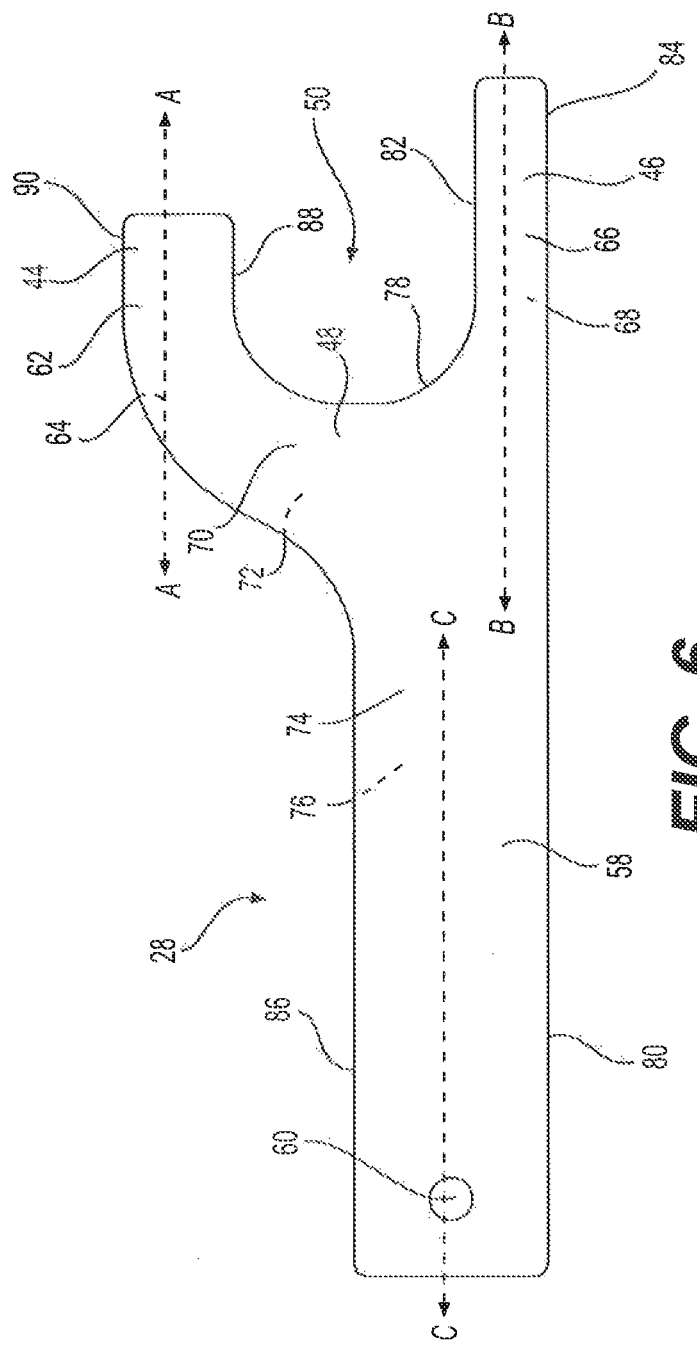

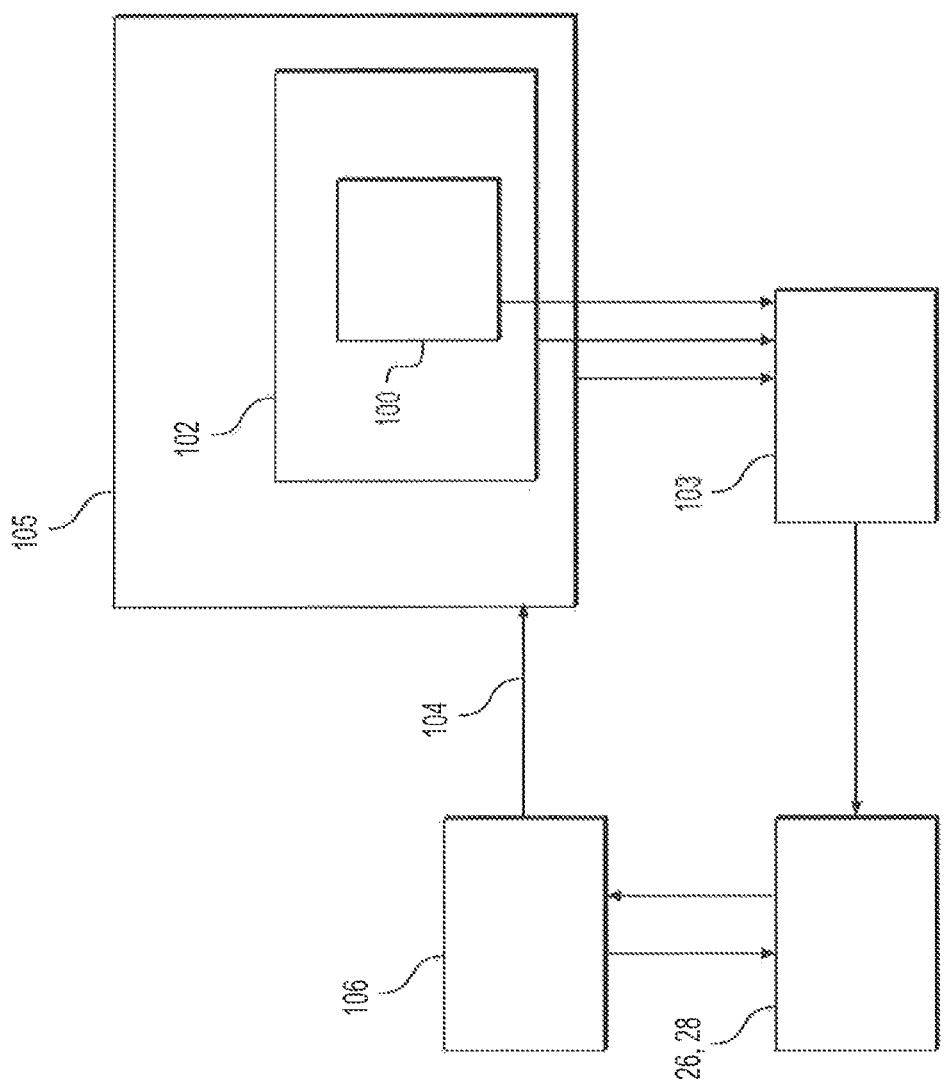

LOCK PLATE CONFIGURED TO RETAIN WEAR RUNNER

TECHNICAL FIELD

The present disclosure relates to a lock plate configured to retain a wear runner, and more particularly, to a lock plate configured to retain a wear runner against a support.

BACKGROUND

In applications or environments where traction is critical or low ground pressure is important, machines propelled by an endless track may be used. Such track-type machines may include, for example, mining machines, dozers, excavators, and skid-steer loaders. These machines may typically include a frame that supports a power source, such as an internal combustion engine, and left and right undercarriage assemblies that transfer power from the power source to terrain on which the machine travels. The left and right undercarriage assemblies may be rigidly or pivotally mounted to the machine frame, and each of the undercarriage assemblies may include an undercarriage frame, a final drive coupled to a drive sprocket driven by the power source, and an idler wheel located at an end of the undercarriage frame remote from the drive sprocket. An endless track is looped around the drive sprocket and idler wheel, and during operation the drive sprocket rotates and engages the endless track, such that the endless track circulates around the drive sprocket and idler wheel, with the portion of the endless track adjacent the ground causing the machine to maneuver.

The undercarriage assemblies may include upper and lower supports between the drive sprocket and idler wheel configured to support the endless track, and the undercarriage assemblies may be configured to support the weight of the machine. In some undercarriage assemblies, the endless track may be supported between the drive sprocket and the idler wheel by carrier rollers and lower rollers distributed along the length of the undercarriage assembly. However, for some machines it may be desirable for the undercarriage assemblies to have a relatively lower profile, and thus, it may be impractical to provide rollers between the drive sprocket and the idler wheel. For example, some continuous mining machines are designed to operate in subterranean spaces having a low ceiling, which may render it advantageous for the mining machine to have a low machine height. For example, in some such machines, in order to reduce the overall height of the machine, instead of providing rollers to support the endless track between the drive sprocket and idler wheel, the machines may include stationary supports against which the endless tracks slide.

The stationary supports, as a result of being exposed to the load and sliding action of the endless tracks, may be subject to excessive wear. This, in turn, may lead to undesirable expense associated with refurbishing or replacing the stationary supports. Therefore, it may be desirable to protect the stationary supports of such machines.

A continuous mining machine is described in U.S. Pat. No. 3,149,882 ("the '882 patent") to Silks et al., issued Sep. 22, 1964. Specifically, the '882 patent discloses a continuous mining machine including a main frame having a cutter frame adjustably supported on the main frame. The main frame is supported on conventional laterally spaced continuous tread devices, which serve to transport the machine along the ground.

Although the continuous mining machine of the '882 patent includes continuous tread devices, it does not describe providing any protection for supports associated with the tread devices. Thus, the supports may be exposed to excessive wear during operation of the machine. This may lead to more frequent maintenance and associated costs.

The lock plate and related assembly disclosed herein may be directed to mitigating or overcoming one or more of the possible drawbacks set forth above.

SUMMARY

According to a first aspect, a lock plate configured to retain a wear runner against a support may include a first retainer arm, a second retainer arm, and a web coupling the first and second retainer arms to one another. The first retainer arm, the second retainer arm, and the web may define a recess configured to receive a retainer pin associated with the wear runner. The first retainer arm and the second retainer arm may have a thickness configured to fit within a groove extending at least partially around the retainer pin, such that the lock plate holds the wear runner against the support on a side of the support opposite the lock plate.

According to another aspect, a lock plate and wear runner assembly may be configured to retain the wear runner against a side of a support opposite the lock plate. The wear runner may include an elongated strip extending along a longitudinal axis between a first end of the strip and a second end of the strip opposite the first end of the strip. The strip may include a first face configured to slide against an endless track of a machine, a second face opposite the first face and configured to abut a support, and at least one retainer pin having a groove extending at least partially around the at least one retainer pin. The lock pate may include a first retainer arm, a second retainer arm, and a web coupling the first and second retainer arms to one another. The first retainer arm, the second retainer arm, and the web may define a recess configured to receive the at least one retainer pin of the wear runner. The first retainer arm and the second retainer arm may have a thickness configured to fit within the groove of the at least one retainer pin, such that the lock plate holds the wear runner against the support on a side of the support opposite the lock plate.

According to a further aspect, a lock plate configured to retain a wear runner against a support member may include a first retainer arm, a second retainer arm, a web coupling the first and second retainer arms to one another, and an extension associated with the web, wherein the extension includes a hole configured to receive a fastener. The first retainer arm, the second retainer arm, and the web may define a recess configured to receive a retainer pin associated with the wear runner. The first retainer arm may include a first face and a second face opposite the first face, and the second retainer arm may include a third face and a fourth face opposite the third face. The first face may be coplanar with the third face, and the second face may be coplanar with the fourth face. The first retainer arm and the second retainer arm may have a thickness configured to fit within a groove extending at least partially around the retainer pin, such that the lock plate holds the wear runner against the support on a side of the support opposite the lock plate.

BRIEF DESCRIPTION OF THE DRAWING

FIG. 6 is a top view of an exemplary embodiment of a lock plate.

FIG. 7 is a schematic view representing an exemplary system for generating a three-dimensional model of a lock plate and/or a wear runner.

DETAILED DESCRIPTION

Figure 1:
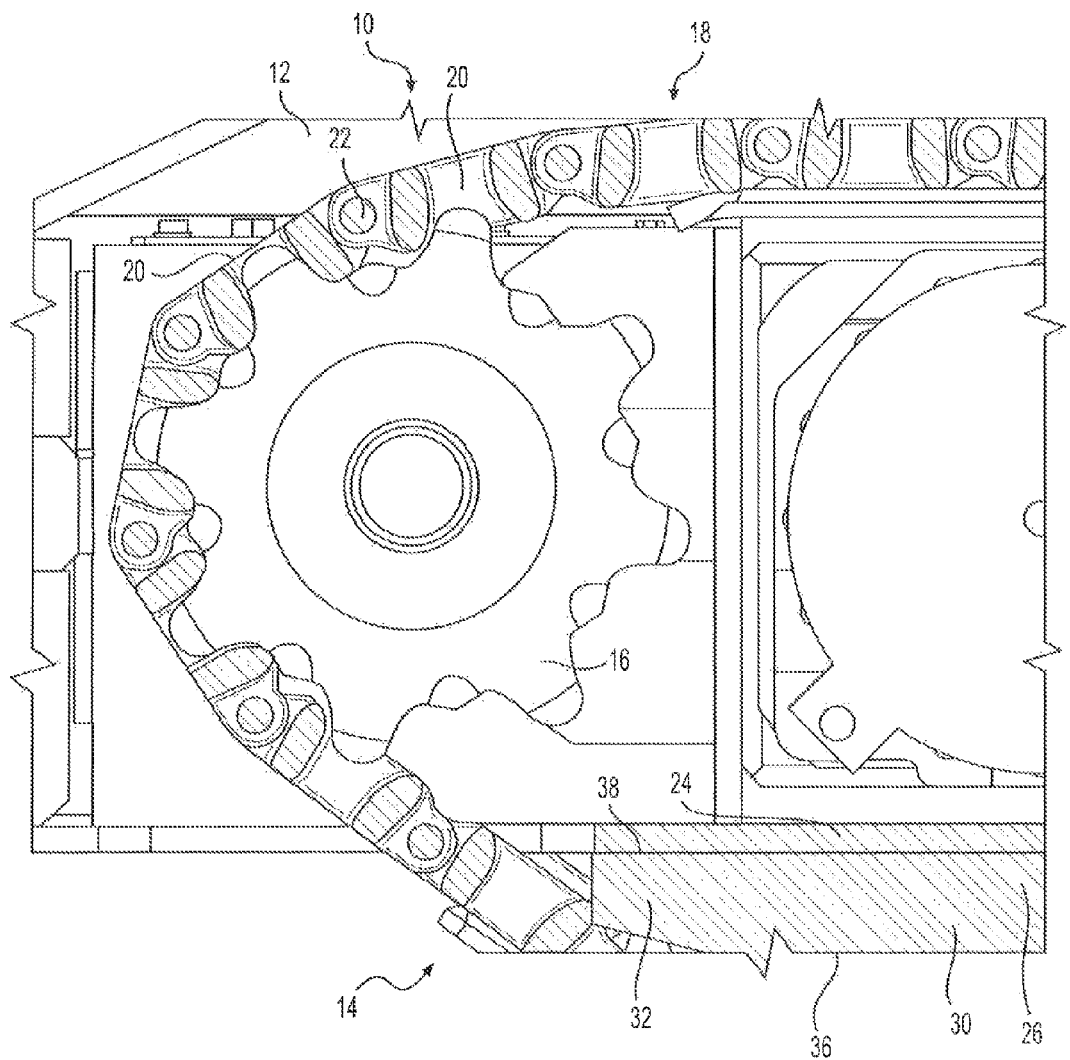
FIG. 1 is a partial side section view of a portion of an exemplary embodiment of a machine including an exemplary embodiment of an undercarriage assembly.

FIG. 1 is a partial side section view of an exemplary embodiment of a track-type machine 10 showing portions of exemplary embodiments of a machine frame 12 and an undercarriage assembly 14. Exemplary machine 10 shown in FIG. 1 is a continuous mining machine configured to operate in subterranean mines where ceilings may be low. It should be noted, however, that the components and assemblies disclosed herein may be used with other types of track-type machines, such as, for example, dozers, excavators, track-type loaders, and skid-steer loaders.

Exemplary machine frame 12 may support an operator station, a power source, such as, for example, an internal combustion engine and/or electric motor, and one or more work tools, such as, for example, one or more cutter heads for scraping minerals from a mine seam. Other work tools are contemplated. Exemplary undercarriage assembly 14 is coupled to machine frame 12 and includes a drive sprocket (not shown) and an idler wheel 16 configured to support an endless track 18. Exemplary endless track 18 includes a plurality of track links 20 pivotally coupled to one another via track pins 22.

Figure 2:
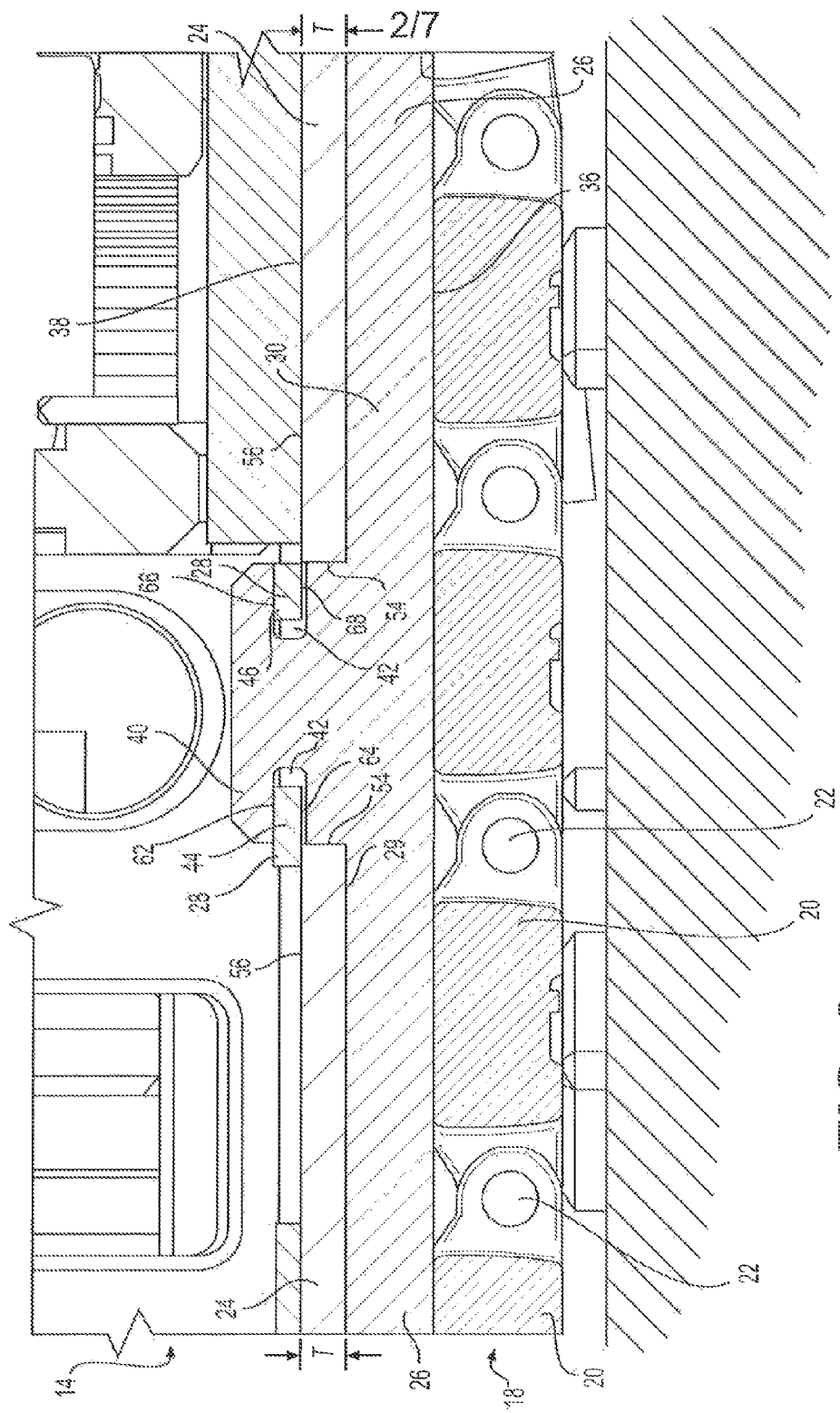
FIG. 2 is a partial section view of a portion of an exemplary embodiment of a machine including exemplary embodiments of a wear runner and a lock plate for an undercarriage assembly.

In the exemplary embodiment shown in FIGS. 1 and 2, undercarriage assembly 14 includes a wear runner 26 positioned between an underside of support 24 and endless track 18. Exemplary wear runner 26 is configured to prevent support 24 from being exposed to endless track 18 as it slides between support 24 and the terrain on which machine 10 is supported. Wear runner 26 may be formed from any suitable material, such as, for example, hardened steel or other materials configured to resist wear and support machine 10.

During operation, the power source of machine 10 provides the drive sprocket with power to respective endless tracks 18 of respective undercarriage assemblies 14, so that endless tracks 18 may circulate in either direction about the drive sprocket and idler wheel 16. As endless tracks 18 circulate, machine 10 may be maneuvered and propelled over the terrain.

In the exemplary embodiment shown in FIGS. 1 and 2, each support 24 and wear runner 26 of respective undercarriage assembly 14 are configured to support endless track 18 and the weight of machine 10. The portion of endless track 18 adjacent the terrain is sandwiched between wear runner 26 and the terrain, such that support 24, wear runner 26, and the portion of endless track 18 adjacent the terrain support the weight of machine 10.

Figure 3:
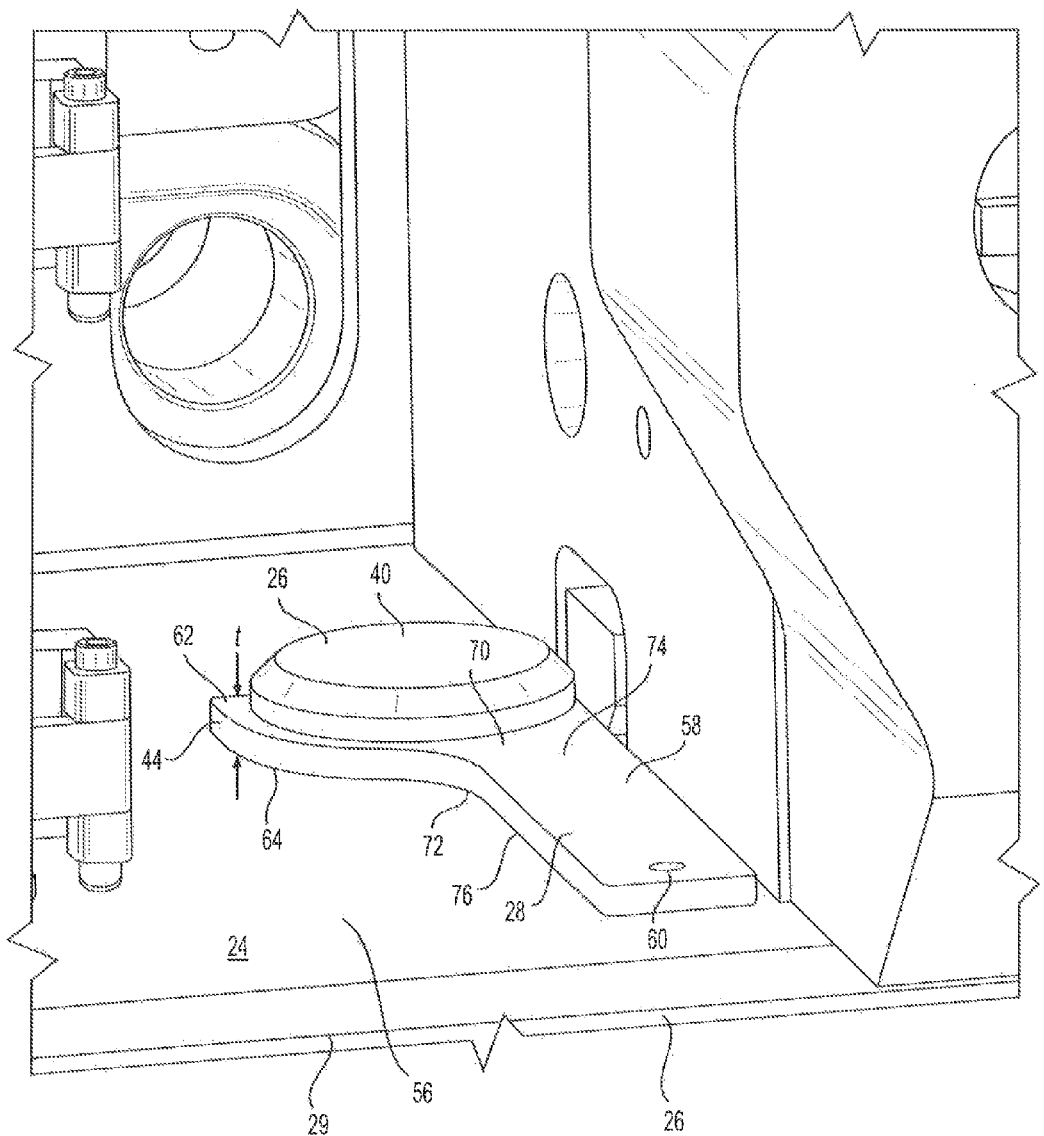
FIG. 3 is a partial perspective view of a portion of an exemplary machine including exemplary embodiments of a wear runner and a lock plate for an undercarriage assembly.
Figure 4:
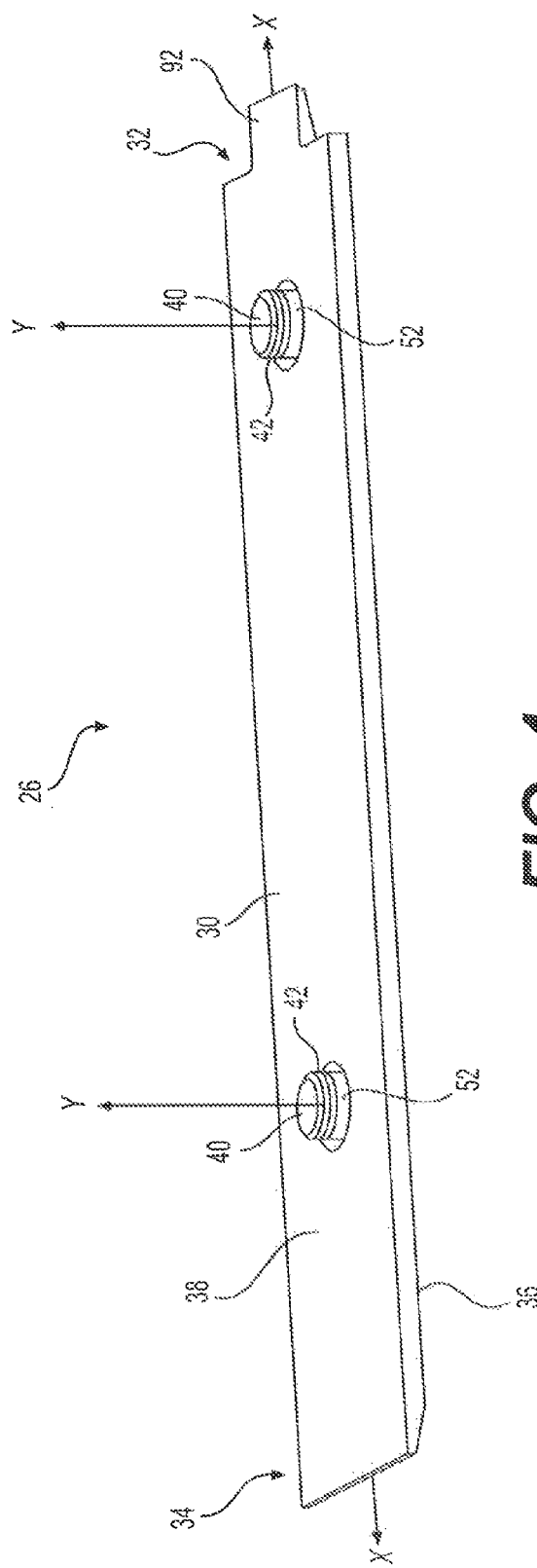
FIG. 4 is a perspective view of an exemplary embodiment of a wear runner.
Figure 5:
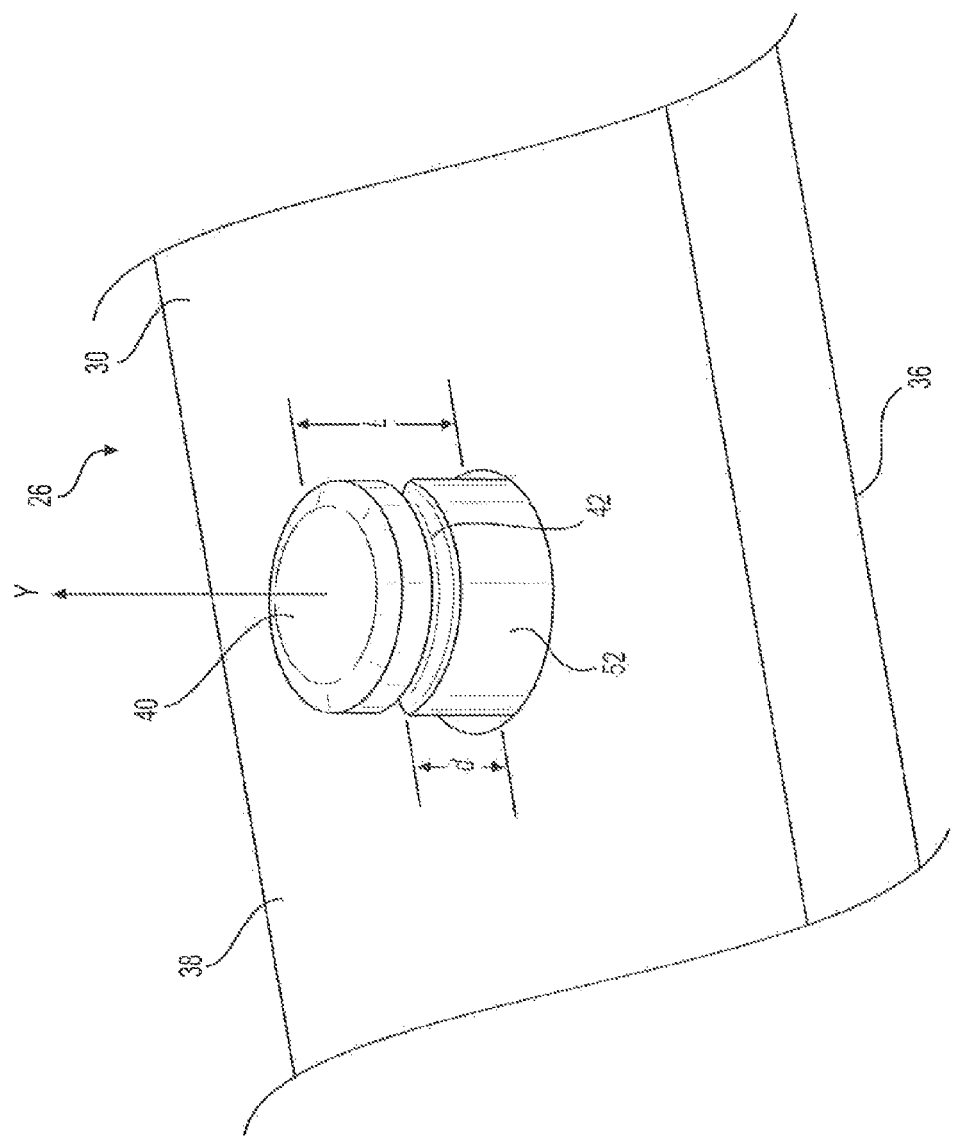
FIG. 5 is a perspective view of a portion of the exemplary embodiment of wear runner shown in FIG. 4.

Exemplary wear runner 26 may be coupled to support 24 via a lock plate 28, as shown in FIGS. 2 and 3. As shown in FIGS. 4 and 5, wear runner 26 may include an elongated strip 30 extending along a longitudinal axis X between a first end 32 of strip 30 and a second end 34 of strip 30 opposite first end 32. Exemplary strip 30 also includes a first face 36 configured to slide against endless track 18, a second face 38 opposite first face 36 and configured to abut against support 24. Exemplary wear runner 26 also includes at least one retainer pin 40 having a groove 42 extending at least partially around at least one retainer pin 40.

As shown in FIGS. 2 and 3, exemplary lock plate 28 is configured to couple wear runner 26 to support 24, such that lock plate 28 holds wear runner 26 against support 24 on a side 29 of support 24 opposite lock plate 28 (e.g., the underside of support 24). In the exemplary embodiment shown, lock plate 28 includes a first retainer arm 44, a second retainer arm 46, and a web 48 coupling first and second retainer arms 44 and 46 to one another. Exemplary first retainer arm 44, second retainer arm 46, and web 48 define a recess 50 configured to receive retainer pin 40 of wear runner 26. For example, first retainer arm 44 and second retainer arm 46 have a thickness t (see FIG. 3) configured to fit within groove 42 of retainer pin 40, such that lock plate 28 holds wear runner 26 against support 24 on a side 29 of support 24 opposite lock plate 28, for example, as shown in FIG. 2.

As shown in FIG. 5, exemplary retainer pin 40 of wear runner 26 includes a shank 52 having a longitudinal axis Y and a length L. Exemplary support 24 has a thickness T (see FIG. 2), and exemplary groove 42 is located a distance d (see FIG. 5) from an end of shank 52 adjacent strip 30 of wear runner 26 that is substantially equal to distance d. Support 24 includes a hole 54 (see FIG. 2) through which shank 52 extends when wear runner 26 is coupled to support 24, and groove 42 is located substantially at an upper surface 56 of support 24. Exemplary lock plate 28 is coupled to retainer pin 40 by sliding lock plate 28 against surface 56 (e.g., and upper surface) of support 24, such that recess 50 of lock plate 28 engages groove 42 of retainer pin 40, thereby retaining wear runner 26 against side 29 of support 24, as shown in FIGS. 2 and 3.

As shown in FIGS. 3 and 6, exemplary lock plate 28 includes an extension 58 associated with web 48, for example, extending away from recess 50. Exemplary extension 58 includes a hole 60 configured to receive a fastener (not shown), such as, for example, a screw, a bolt, or a rivet. For such embodiments, once lock plate 28 is engaged with retainer pin 40 of wear runner 26 via engagement between groove 42 and one or more of first retainer arm 44, second retainer arm 46, and web 48, a fastener may be used to secure extension 58 of lock plate 28 to support 24 via hole 60 of extension 58. It is contemplated that extension 58 of lock plate 28 may be secured to support 24 using other structures and methods, such as, for example, via welding and/or adhesives.

As shown in FIG. 6, first retainer arm 44 of exemplary lock plate 28 includes a first face 62 and a second face 64 opposite first face 62, and second retainer arm 46 includes a third face 66 and a fourth face 68 opposite third face 66. In the exemplary embodiment shown, first face 62 is coplanar with third face 66, and second face 64 is coplanar with fourth face 68. Exemplary web 48 includes a fifth face 70 and a sixth face 72 opposite fifth face 70. Fifth face 70 is coplanar with first face 62 and third face 66, and sixth face 72 is coplanar with second face 64 and fourth face 68. In the exemplary embodiments shown, lock plate 28 includes a first plate face 74 and a second plate face 76 opposite first plate face 74, and first plate face 74 and second plate face 76 are substantially planar and substantially parallel with respect to one another. Other non-coplanar configurations are contemplated.

As shown in FIG. 6, recess 50 of lock plate 28 defines a semi-circular portion 78 configured to receive a retainer pin 40 having a circular cross-section, for example, at a portion of shank 52 corresponding to groove 42. It is contemplated that shank 52 may have a circular cross-section or polygonal cross-section, for example, at the portion of shank 52 corresponding to groove 42, and web 48 may be shaped to correspond to the cross-sectional shape of the cross-section of shank 52.

In the exemplary embodiment shown in FIG. 6, first retainer arm 44 has a longitudinal axis A, and second retainer arm 46 has a longitudinal axis B, and longitudinal axis A of first retainer arm 44 and longitudinal axis B of second retainer arm B are parallel. Exemplary extension 58 associated with web 48 has a longitudinal axis C, and longitudinal axis C of extension 58 is parallel to longitudinal axis A of first retainer arm 44.

As shown in FIG. 6, extension 58 of exemplary lock plate 28 includes a first extension edge 80, and second retainer arm 46 includes a proximal edge 82 partially defining recess 50 and a remote edge 84 opposite proximal edge 82. In the exemplary embodiment shown, remote edge 84 of second retainer arm 46 and first extension edge 80 are substantially co-linear. Exemplary extension 58 also includes a second extension edge 86 opposite first extension edge 80. First retainer arm 44 includes a proximal edge 88 partially defining recess 50 and a distal edge 90 opposite proximal edge 88 of first retainer arm 44, and distal edge 90 of first retainer arm 44 merges with second extension edge 86 of extension 58. For example, distal edge 90 of first retainer arm 44 extends toward first extension edge 80 of extension 58 and merges with second extension edge 86 of extension 58.

As shown in FIGS. 4 and 5, exemplary wear runner 26 includes two retainer pins 40. Wear runners 26 having fewer or more retainer pins 40 are contemplated. In the exemplary embodiment shown, retainer pins 40 extend from second face 38 of strip 30. As shown in FIG. 4, first end 32 of first face 36 of strip 30 is tapered toward second face 38 of strip 30. This may help track links 20 disengage from idler wheel 16 as endless track 18 circulates. For example, as shown in FIG. 4, first end 32 of strip 30 may include a chisel-like protrusion 92 having a first width narrower than a second width associated with another portion of strip 30 (e.g., the remainder of strip 30).

INDUSTRIAL APPLICABILITY

Wear runner 26 and/or lock plate 28 disclosed herein may be used in association with any track-type machine. For example, wear runner 26 and/or lock plate 28 may be used with a continuous mining machine configured to operate in subterranean mines where ceilings may be low. In addition, wear runner 26 and/or lock plate 28 may be used with other types of track-type machines, such as, for example, dozers, excavators, track-type loaders, and skid-steer loaders.

Wear runner 26 and/or lock plate 28 may serve to protect supports 24 from wear associated with operation endless tracks 18. For example, wear runners 26 and/or lock plates 28 may be configured such that wear runners 26 may be removed from machine 10 and refurbished or replaced without necessarily replacing other parts of undercarriage assembly 14, such as, for example, supports 24. In addition, wear runners 26 and/or lock plates 28 may be configured such that wear runners 26 may be selectively removed from undercarriage assembly 14 in an efficient manner. For example, lock plates 28 may be disengaged from respective retainer pins 40 by sliding first retainer arm 44, second retainer arm 46, and/or web 48 from groove 42 of retainer pins 40, thereby permitting retainer pins 40 to be withdrawn from respective holes 54 in supports 24, so that wear runners 26 can be removed from the underside of supports 24. Furthermore, due to the relatively low profile of lock plates 28, according to at least some embodiments, lock plates 28 do not occupy a large amount of space above supports 24, thereby facilitating improved packaging of other components of machine 10. Thus, wear runners 26 may be secured to supports 24 in a removable manner without creating packages difficulties. As a result, wear runners 26 and/or lock plates 28 may result in improved machine designs and increased productivity of machine 10.

The disclosed lock plate and/or wear runner may be manufactured using conventional techniques, such as, for example, casting or molding. Alternatively, the disclosed lock plate and/or wear runner may be manufactured using conventional techniques generally referred to as additive manufacturing or additive fabrication. Known additive manufacturing/fabrication processes include techniques, such as, for example, 3D printing. 3D printing is a process in which material may be deposited in successive layers under the control of a computer. The computer controls additive fabrication equipment to deposit the successive layers according to a three-dimensional model (e.g., a digital file, such as an AMF or STL file) that is configured to be converted into a plurality of slices, for example, substantially two-dimensional slices, that each define a cross-sectional layer of the lock plate and/or wear runner in order to manufacture, or fabricate, the lock plate and/or wear runner. In one instance, the disclosed lock plate and/or wear runner would be an original component, and the 3D printing process would be utilized to manufacture the lock plate and/or wear runner. In other instances, the 3D process could be used to replicate existing lock plates and/or wear runners, and the replicated lock plates and/or wear runners could be sold as aftermarket parts. These replicated aftermarket lock plates and/or wear runners could be either exact copies of the original lock plate and/or wear runner or pseudo copies differing in only non-critical aspects.

With reference to FIG. 7, the three-dimensional model 100 used to represent an original lock plate and/or wear runner may be on a computer-readable storage medium 102, such as, for example, magnetic storage including floppy disk, hard disk, or magnetic tape; semiconductor storage such as, for example, a solid state disk (SSD) or flash memory; optical disc storage; magneto-optical disc storage; or any other type of physical memory on which information or data readable by at least one processor may be stored. This storage medium may be used in connection with commercially available 3D printers 103 to manufacture, or fabricate, the lock plate and/or wear runner. Alternatively, the three-dimensional model may be transmitted electronically to the 3D printer 103 in a streaming fashion without being permanently stored at the location of the 3D printer 103. In either instance, the three-dimensional model constitutes a digital representation of the lock plate and/or wear runner suitable for use in manufacturing the lock plate and/or wear runner.

The three-dimensional model may be formed in a number of known ways. In general, the three-dimensional model is created by inputting data 104 representing the lock plate and/or wear runner to a computer or a processor 105, such as a cloud-based software operating system. The data may then be used as a three-dimensional model representing the physical lock plate and/or wear runner. The three-dimensional model is intended to be suitable for the purposes of manufacturing the lock plate and/or wear runner. In an exemplary embodiment, the three-dimensional model is suitable for the purpose of manufacturing the lock plate and/or wear runner by an additive manufacturing technique.

In the exemplary embodiment shown in FIG. 7, the inputting of data may be achieved with a 3D scanner 106. The method may involve contacting the lock plate and/or wear runner via a contacting and data receiving device, and receiving data from the contacting in order to generate the three-dimensional model. For example, 3D scanner 106 may be a contact-type scanner. The scanned data may be imported into a 3D modeling software program to prepare a digital data set. In some embodiments, the contacting may occur via direct physical contact using a coordinate measuring machine that measures the physical structure of the lock plate and/or wear runner by contacting a probe with the surfaces of the lock plate and/or wear runner in order to generate a three-dimensional model. In other embodiments, the 3D scanner 106 may be a non-contact type scanner, and the method may include directing projected energy (e.g., light or ultrasonic energy) onto the lock plate and/or wear runner to be replicated and receiving the reflected energy. From this reflected energy, a computer may be used to generate a computer-readable three-dimensional model for use in manufacturing the lock plate and/or wear runner. In various embodiments, multiple two-dimensional images may be used to create a three-dimensional model. For example, 2D slices of a 3D object may be combined to create the three-dimensional model. In lieu of a 3D scanner, the inputting of data may be performed using computer-aided design (CAD) software. In such instances, the three-dimensional model may be formed by generating a virtual 3D model of the disclosed lock plate and/or wear runner using the CAD software. A three-dimensional model may be generated from the CAD virtual 3D model in order to manufacture the lock plate and/or wear runner.

The additive manufacturing process utilized to create the disclosed lock plate and/or wear runner may involve materials, such as, for example, plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

It will be apparent to those skilled in the art that various modifications and variations can be made to the exemplary disclosed lock plate and/or wear runner. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A lock plate configured to retain a wear runner against a support, the lock plate comprising:
a first retainer arm having a proximal end and a distal end;
a second retainer arm having a proximal end and a distal end; and
a web coupling the proximal ends of the first and second retainer arms to one another with the distal ends of the first and second retainer arms being spaced apart from each other,
wherein the first retainer arm, the second retainer arm, and the web define a C-shaped recess configured to engage with a retainer pin associated with the wear runner by sliding the lock plate along a surface of the support in a direction perpendicular to a central axis of the retainer pin, and
wherein the first retainer arm and the second retainer arm have a thickness configured to fit within a groove extending at least partially around the retainer pin, such that the lock plate holds the wear runner against the support on a side of the support opposite the lock plate.

2. The lock plate of claim 1, further including an extension associated with the web, wherein the extension includes a hole configured to receive a fastener.

3. The lock plate of claim 1, wherein the first retainer arm includes a first face and a second face opposite the first face, wherein the second retainer arm includes a third face and a fourth face opposite the third face, and wherein the first face is coplanar with the third face, and the second face is coplanar with the fourth face.

4. The lock plate of claim 3, wherein the web includes a fifth face and a sixth face opposite the fifth face, and wherein the fifth face is coplanar with the first face and the third face, and the sixth face is coplanar with the second face and the fourth face.

5. The lock plate of claim 4, wherein the lock plate includes a first plate face and a second plate face opposite the first plate face, and wherein the first plate face and the second plate face are substantially planar and substantially parallel with respect to one another.

6. The lock plate of claim 1, wherein the recess defines a semi-circular portion configured to receive the retainer pin having a circular cross-section.

7. The lock plate of claim 1, wherein the first retainer arm has a longitudinal axis, and the second retainer arm has a longitudinal axis, and wherein the longitudinal axis of the first retainer arm and the longitudinal axis of the second retainer arm are parallel.

8. The lock plate of claim 7, further including an extension associated with the web, wherein the extension has a longitudinal axis, and wherein the longitudinal axis of the extension is parallel to the longitudinal axis of the first retainer arm.

9. The lock plate of claim 1, further including an extension associated with the web and including a first extension edge, wherein the second retainer arm includes a proximal edge partially defining the recess and a remote edge opposite the proximal edge, and wherein the remote edge of the second retainer arm and the first extension edge are substantially co-linear.

10. The lock plate of claim 9, wherein the extension includes a second extension edge opposite the first extension edge, wherein the first retainer arm includes a proximal edge partially defining the recess and a distal edge opposite the proximal edge of the first retainer arm, and wherein the distal edge of the first retainer arm merges with the second extension edge.

11. The lock plate of claim 10, wherein the distal edge of the first retainer arm extends toward the first extension edge and merges with the second extension edge.

12. A method of creating a computer-readable three-dimensional model suitable for use in manufacturing the lock plate of claim 1, the method comprising:

inputting data representing the lock plate to a computer; and using the data to represent the lock plate as a three-dimensional model, the three dimensional model being suitable for use in manufacturing the lock plate.

13. The method of claim 12, wherein the inputting of data includes one or more of using a contact-type 3D scanner to contact the lock plate, using a non-contact 3D scanner to project energy onto the lock plate and receive reflected energy, and generating a virtual three-dimensional model of the lock plate using computer-aided design (CAD) software.

14. A computer-readable three-dimensional model suitable for use in manufacturing the lock plate of claim 1.

15. A computer-readable storage medium having data stored thereon representing a three-dimensional model suitable for use in manufacturing the lock plate of claim 1.

16. A method for manufacturing the lock plate of claim 1, the method comprising the steps of:
providing a computer-readable three-dimensional model of the lock plate, the three-dimensional model being configured to be converted into a plurality of slices that each define a cross-sectional layer of the lock plate; and
successively forming each layer of the lock plate by additive manufacturing.

17. A lock plate and wear runner assembly configured to retain a wear runner against a side of a support opposite the lock plate, the assembly comprising:
the wear runner including:
an elongated strip extending along a longitudinal axis between a first end of the strip and a second end of the strip opposite the first end of the strip, the strip including a first face configured to slide against an endless track of a machine, a second face opposite the first face and configured to abut the support, and at least one retainer pin having a groove extending at least partially around the at least one retainer pin; and
the lock plate including:
a first retainer arm;
a second retainer arm; and
a web coupling the first and second retainer arms to one another,
wherein the first retainer arm, the second retainer arm, and the web define a C-shaped recess configured to engage with the at least one retainer pin of the wear runner by sliding the lock plate along a surface of the support in a direction perpendicular to a central axis of the retainer pin, and
wherein the first retainer arm and the second retainer arm have a thickness configured to fit within the groove of the at least one retainer pin, such that the lock plate holds the wear runner against the support on a side of the support opposite the lock plate.

18. The assembly of claim 17, wherein the at least one retainer pin extends from the second face of the strip.

19. The assembly of claim 17, wherein the first end of the first face of the strip is tapered toward the second face of the strip.

20. The assembly of claim 17, wherein the first end of the strip includes a chisel-like protrusion having a first width narrower than a second width associated with another portion of the strip.

21. The assembly of claim 17, wherein the lock plate further includes an extension associated with the web, and wherein the extension includes a hole configured to receive a fastener.

22. The assembly of claim 17, wherein the first retainer arm includes a first face and a second face opposite the first face, wherein the second retainer arm includes a third face and a fourth face opposite the third face, and wherein the first face is coplanar with the third face, and the second face is coplanar with the fourth face.

23. The assembly of claim 17, wherein the recess of the lock plate defines a semi-circular portion and the at least one retainer pin has a circular cross-section, and wherein the semi-circular portion is configured to receive the at least one retainer pin.

24. The assembly of claim 17, wherein the first retainer arm has a longitudinal axis, and the second retainer has a longitudinal axis, and wherein the longitudinal axis of the first retainer arm and the longitudinal axis of the second retainer arm are parallel.

25. A lock plate configured to retain a wear runner against a support member, the lock plate comprising:
a first retainer arm;
a second retainer arm;
a web coupling the first and second retainer arms to one another; and
an extension associated with the web, wherein the extension includes a hole configured to receive a fastener,
wherein the first retainer arm, the second retainer arm, and the web define a C-shaped recess configured to engage with a retainer pin associated with the wear runner by sliding the lock plate along a surface of the support member in a direction perpendicular to a central axis of the retainer pin,
wherein the first retainer arm includes a first face and a second face opposite the first face, wherein the second retainer arm includes a third face and a fourth face opposite the third face, and wherein the first face is coplanar with the third face, and the second face is coplanar with the fourth face, and
wherein the first retainer arm and the second retainer arm have a thickness configured to fit within a groove extending at least partially around the retainer pin, such that the lock plate holds the wear runner against the support on a side of the support opposite the lock plate.

* * * * *